United States Patent
Krishnamoorthy et al.

(10) Patent No.: US 6,625,165 B1
(45) Date of Patent: Sep. 23, 2003

(54) DATA LINK PROTOCOL FOR WIRELESS SYSTEMS

(75) Inventors: Rajeev Krishnamoorthy, Middletown, NJ (US); Shankar Narayanaswamy, Sunnyvale, CA (US); Markus Rupp, Lincroft, NJ (US); Harish Viswanathan, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/361,861

(22) Filed: Jul. 27, 1999

(51) Int. Cl.[7] .................................................. H04J 3/16
(52) U.S. Cl. ...................................... 370/465; 370/474
(58) Field of Search ................................. 370/314, 347, 370/465, 473, 474; 714/748, 749, 750; 375/222, 298, 261, 324, 340

(56) References Cited

U.S. PATENT DOCUMENTS

| | | | |
|---|---|---|---|
| 5,243,629 A | * 9/1993 | Wei | 375/299 |
| 5,677,918 A | 10/1997 | Tran et al. | 714/748 |
| 5,875,202 A | * 2/1999 | Venters et al. | 714/752 |
| 5,923,650 A | * 7/1999 | Chen et al. | 370/468 |
| 6,307,867 B1 | * 10/2001 | Roobol et al. | 370/470 |

FOREIGN PATENT DOCUMENTS

| EP | 0938207 A2 | 8/1999 | H04L/1/12 |
|---|---|---|---|

OTHER PUBLICATIONS

European Patent Office Search Report, Application No. 00306–62.1–2216, The Hague, Oct. 20, 2000.

* cited by examiner

*Primary Examiner*—Chau Nguyen
*Assistant Examiner*—Keith M. George
(74) *Attorney, Agent, or Firm*—Eugene J. Rosenthal

(57) ABSTRACT

A two layered segmentation technique coupled with a two layer error detection technique is used to implement the wired to wireless network interface. A wireless network divides network layer packets from a wired network into radio data link packets, and the information within the radio data link packets is divided into portions that can be placed into time slots. Error detection is performed on each of the time slots and also at the radio data link packet level to determine if there is an error within the radio data link packet. Errors detected in any radio data link packet only requires retransmission of the radio data link packet in which the error was detected, and, advantageously, do not require retransmission of the entire network layer packet as would have been required in a system that mapped directly from network layer packets to time slots. Further advantageously, the system is able to be employed by systems that utilize dynamic constellation mapping schemes which result in different time slots for the same user being mapped with different constellations, and so they have different bit to symbol ratios. This is because such changes in the constellation mapping scheme are handled at the time slot level, and are not seen at the radio data link packet level. The segmentation of the network layer packets into radio link packets is independent of the number and size of the time slots which will carry the radio link packets.

17 Claims, 3 Drawing Sheets

DATA LINK PROTOCOL FOR WIRELESS SYSTEMS

TECHNICAL FIELD

This invention relates to the art of wireless systems, and more particularly, to a data link protocol used to transfer information over the wireless interface.

BACKGROUND OF THE INVENTION

Often wireless networks are interfaced to one or more wired networks. The various wired networks employ protocols that are unique to them and are often not appropriate for use in wireless transmission. In particular, the wireless transmission requires its own protocols to better deal with the variations and unreliability of the wireless channels. Thus, it is necessary to employ protocol translators to convert between the protocols employed by the wireless networks and the protocols employed by any wired network to which they interface. Such wireless protocols should be transparent to the wired network.

SUMMARY OF THE INVENTION

We have recognized that one good way to implement the wired to wireless network interface is, in accordance with the principles of the invention, to employ a two layered segmentation technique coupled with a two layer error detection technique. In particular, data from a source external to the wireless network, e.g., a connected wired network, typically is arranged into network layer packets, which are received at the wireless network. The wireless network then divides the network layer packets into radio data link packets, and the information within the radio data link packets is divided into portions that can be placed into, although not necessarily completely occupy, one or more time slots. Error detection is performed on each of the time slots. However, the nature of the error detection code is such that each of the time slot level transmissions may appear to be error free, and yet there is an error somewhere within the radio data link packet. Therefore, a second level of error detection is performed at the radio data link packets level to determine if there is an error within the radio data link packet. In accordance with an aspect of the invention, errors detected at the radio data link packets only require retransmission of the radio data link packets in which the error was detected, and, advantageously, do not require retransmission of the entire network layer packet as would have been required in a system that mapped directly from network layer packets to time slots.

Further advantageously, the system is able to be employed by systems that utilize dynamic constellation mapping schemes which result in different time slots for the same user being mapped with different constellations, and so they have different bit to symbol ratios. This is because such changes in the constellation mapping scheme are handled at the time slot level, and are not seen at the radio data link packet level. The segmentation of the network layer packets into radio link packets is independent of the number and size of the time slots which will carry the radio link packets. Additionally, the system is able to transmit radio link packets without requiring such radio link packets to be strictly in the same sequence that the data carried by those radio link packets appear in the network layer packet from which the radio link packets were developed. Thus, the system is robust, transparent to the wired network, and often minimizes the amount of retransmission that is required in the face of errors.

DETAILED DESCRIPTION

Figure 1:
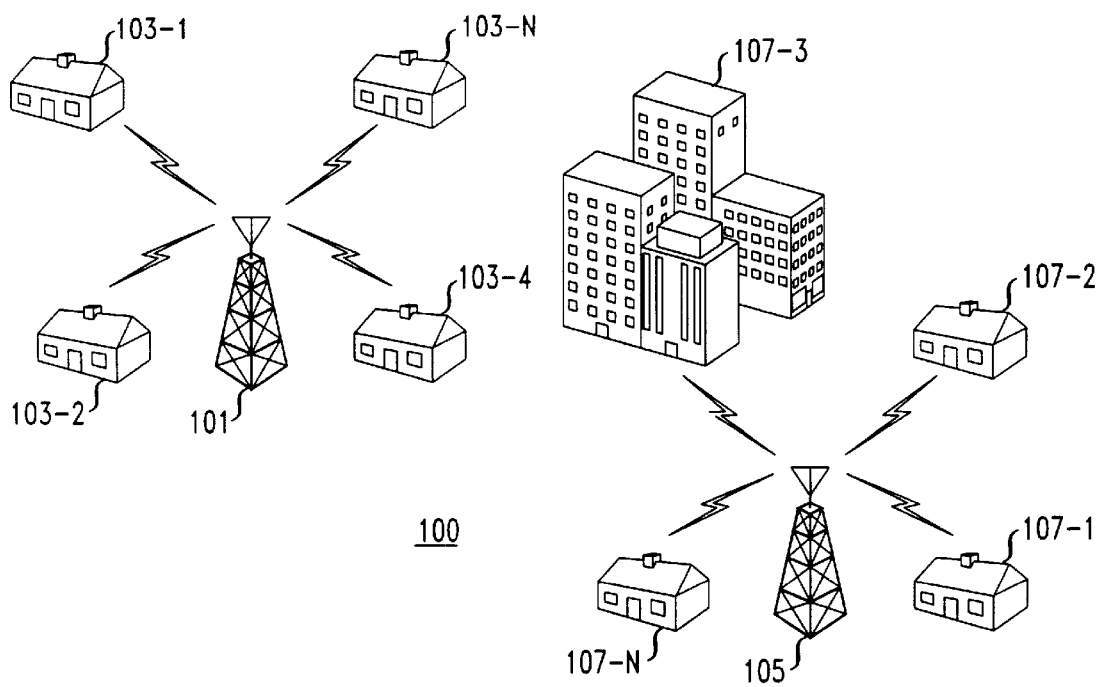
FIG. 1 shows exemplary steerable beam TDMA wireless communication system arranged in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

FIG. 1 shows exemplary steerable beam TDMA wireless communication system 100 arranged in accordance with the principles of the invention. Wireless communication system 100 includes base station antenna 101 serving remote terminals 103-1 through 103-N, collectively remote terminals 103, and base station antenna 105 serving remote terminals 107-1 through 107-N, collectively remote terminals 107. The pairing of a remote terminal with a particular base station is determined by the implementor based on the best signal power and least interference that can be achieved for a remote terminal-base station pair.

In steerable beam wireless communication system 100, the beam pattern formed at the remote terminal location may be of any arbitrary width. The particular width of the beam is a function of the directionality of the antenna design and often it is a wide beam. Typically the same beam pattern is used for both transmitting and receiving. For example, an antenna at the remote terminal location having a 30° angle has been employed in one embodiment of the invention, although any other angle may be used.

Communication may be simultaneously bidirectional between the base station and the remote terminal, e.g., one frequency is used for transmission from the base station to the remote terminal while a second frequency is used for transmission from the remote terminal to the base station.

Steerable beam wireless communication system 100 of FIG. 1 is a time division multiple access (TDMA) system. Such systems employ a repeating frame structure, within each frame there being time slots. Each time slot is a particular length of time. Each time slot may carry the same amount of information, or a different amount of information as any of the other time slots.

Figure 2:
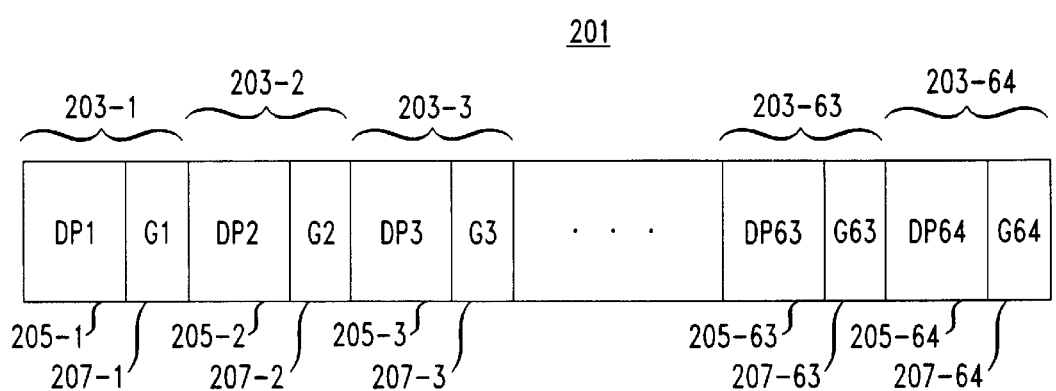
FIG. 2 shows an exemplary frame structure for use in the steerable beam wireless communication system shown in FIG. 1.

For example, the time slots may each have a particular length and contain the same number of symbols, but the number of bits per symbol employed in each time slot may be different. FIG. 2 shows an exemplary frame structure 201 for use in steerable beam wireless communication system 100. Frame structure 201 is 2.5 ms long and contains within it 64 time slots 203, including time slots 203-1 through 203-64. Each of time slots 203 includes a data part (DP) 205 and a guard interval (G) part 207. For example, each of time slots 203 is 2.5/64 ms, which is 39.0625 µs. Each guard interval 207 is 2 µs leaving each data part 205 as being 37.0625 µs. The same frame structure is used for both the uplink, i.e., from the remote terminal to the base station, and for the downlink, i.e., from the base station to the remote terminal.

More specifically, each time slot 203 is divided into symbols, the number of which is determined by the implementor based on bandwidth and the time slot period. For example, as noted above, a 39.0625 µs time slot period with a guard interval of 2 µs leaves a data part of 37.0625 µs. If the channel bandwidth is 5 MHz, and the useful bandwidth 3.9936 MHz, then there are 148 symbols, each of length approximately 250.04 ns. The constellation used to encode the symbols of each time slots 203 may be different for each time slot 203 within a single frame 201 and may be different for a particular time slot 203 in different consecutive frames 201.

In FIG. 2 time slot 203-1 uses quadrature phase shift keying (QPSK) modulation, time slot 203-2 uses 8-ary phase shift keying (8-PSK), time slot 203-3 uses 16-ary quadrature amplitude modulation (16-QAM), time slot 203-63 uses 32-ary quadrature amplitude modulation (32-QAM), and time slot 203-64 uses 64-ary quadrature amplitude modulation (64-QAM). The modulation schemes employed by each respective one of the other time slots may be one of the foregoing or it may be any one selected from a set of modulation schemes available to the system as implemented by the implementor and may be independent of the modulation scheme employed by any other time slot.

Figure 3:
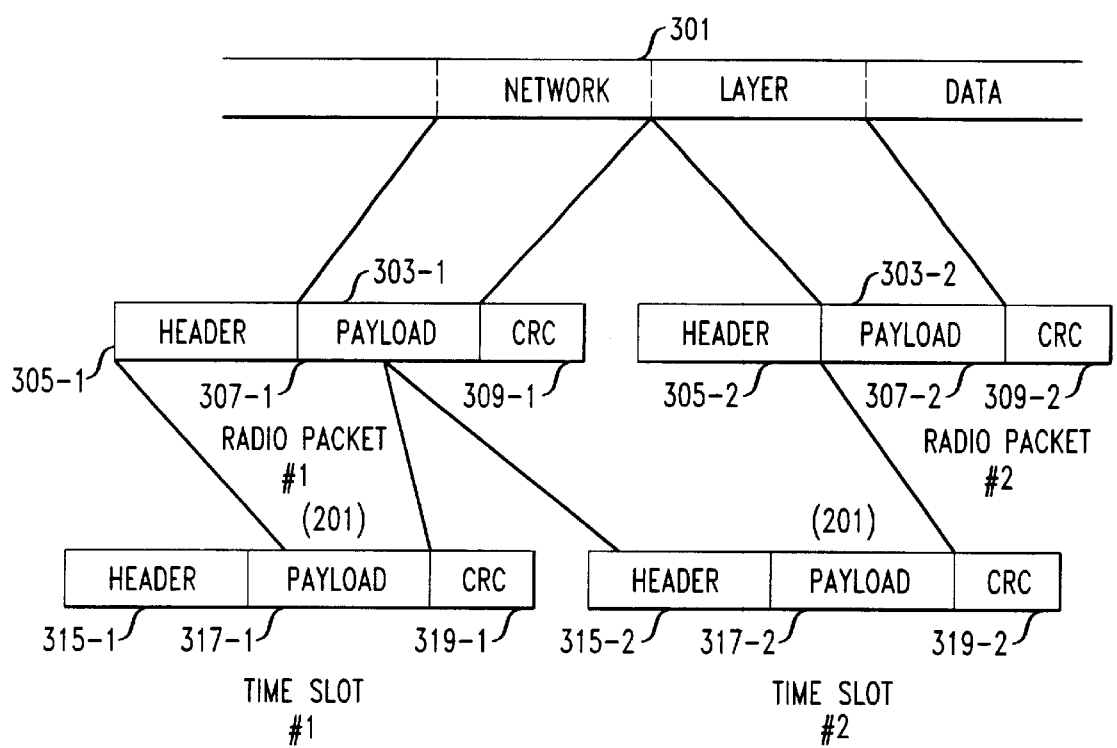
FIG. 3 shows network layer packet, e.g., as received from a wired network, and its segmentation into radio data link packets for transmission over the wireless network of FIG. 1.

FIG. 3 shows network layer packet 301, e.g., as received from a wired network, and its segmentation into radio data link packets 303 for transmission over wireless network 100 (FIG. 1). Each of radio data link packets 303 (FIG. 3) has a header 305, payload 307, and a cyclic redundancy check (CRC) 309. Radio data link packets 303 are further segmented into time slot sized pieces for a) placement into a one of time slots 203 (FIG. 2) and b) ultimate transmission over wireless network 100 (FIG. 1). Similar to radio data link packets 303, each time slot contains a) header 315, b) payload 317 and c) CRC 319.

Note that the information from each network layer packet 301 is divided into multiple radio data link packets 303, and that in turn each of radio data link packets 303 is transmitted as one or more full and/or partial time slot. For example, the data of a network layer packet 301 may fit in one, less than one, or more than one time slot. If a portion, or the entirety, of one of radio data link packets 303 that is placed in a time slot does not fill that entire time slot, information from the next one of radio data link packets 303 may be employed to fill the time slot.

Header 315 is transmitted always using the same modulation scheme, which may be different from the modulation schemes used for modulating payload 317 and/or CRC 319. Typically, the modulation scheme used for header 315 is one that is a subset of all the other modulation schemes employed by system 100 (FIG. 1), i.e., all of the points of the modulation scheme used for header 315 are also found in all of the other modulations schemes used in the system. Payload 317 (FIG. 3) and CRC 319 use the same modulation scheme. Since each time slot may use a different modulation scheme, it will be appreciated that the number of bits transmitted in each time slot will be different for each time slot using a different modulation scheme.

Error detection is performed on each of time slots 201. In the event an error is detected at the time slot level it is possible that only the information of that time slot need to be retransmitted. Alternatively, the entire radio data link packets 303 may be retransmitted. The error detection performed at the time slot level is useful in determining the quality of the radio link, so that the modulation scheme that may be employed can be determined.

The nature of the error detection code is such that for a particular radio data link packet 303 each of the time slot level transmissions thereof may appear to be error free, and yet there is an error somewhere within the particular radio data link packet 303. This is because there is no perfect CRC check, i.e., one that can detect all errors. Therefore, a second level of error detection, i.e., a second CRC check using CRC 309, is performed at the level of radio data link packets 303 to determine if there is an error within the packet.

In accordance with an aspect of the invention, if there is an error within a time slot or within one of radio data link packets 303, the entire radio data link packet in which the error occurs needs to be retransmitted. However, it is possible that the error-containing radio data link packet as originally transmitted was transmitted in time slots that employed a modulation scheme that permitted a higher number of bits per symbol than can now be transmitted per time slot. As a result, more time slots are now required to transmit the same information. Advantageously, by segmenting the network layer packet into radio data link packets only the radio data link packet containing the error need be retransmitted, and not the entire network layer packet, notwithstanding the change in the modulation scheme. Thus, the segmentation of the network layer packets into radio link packets is independent of the number and size of the time slots which will carry the radio link packets, which is at least in part a function of the modulation scheme. Furthermore, making the radio link data packet the basic unit of retransmission avoids complexity that would otherwise arise due to changes in the number of bit/symbol in the time slots during retransmission.

Additionally, the system is able to transmit radio link packets without requiring such radio link packets to be strictly in the same sequence that the data carried by those radio link packets appears in the network layer packet from which the radio link packets were developed. Thus, the system is robust, transparent to the wired network, and often minimizes the amount of retransmission that is required in the face of errors.

Figure 4:
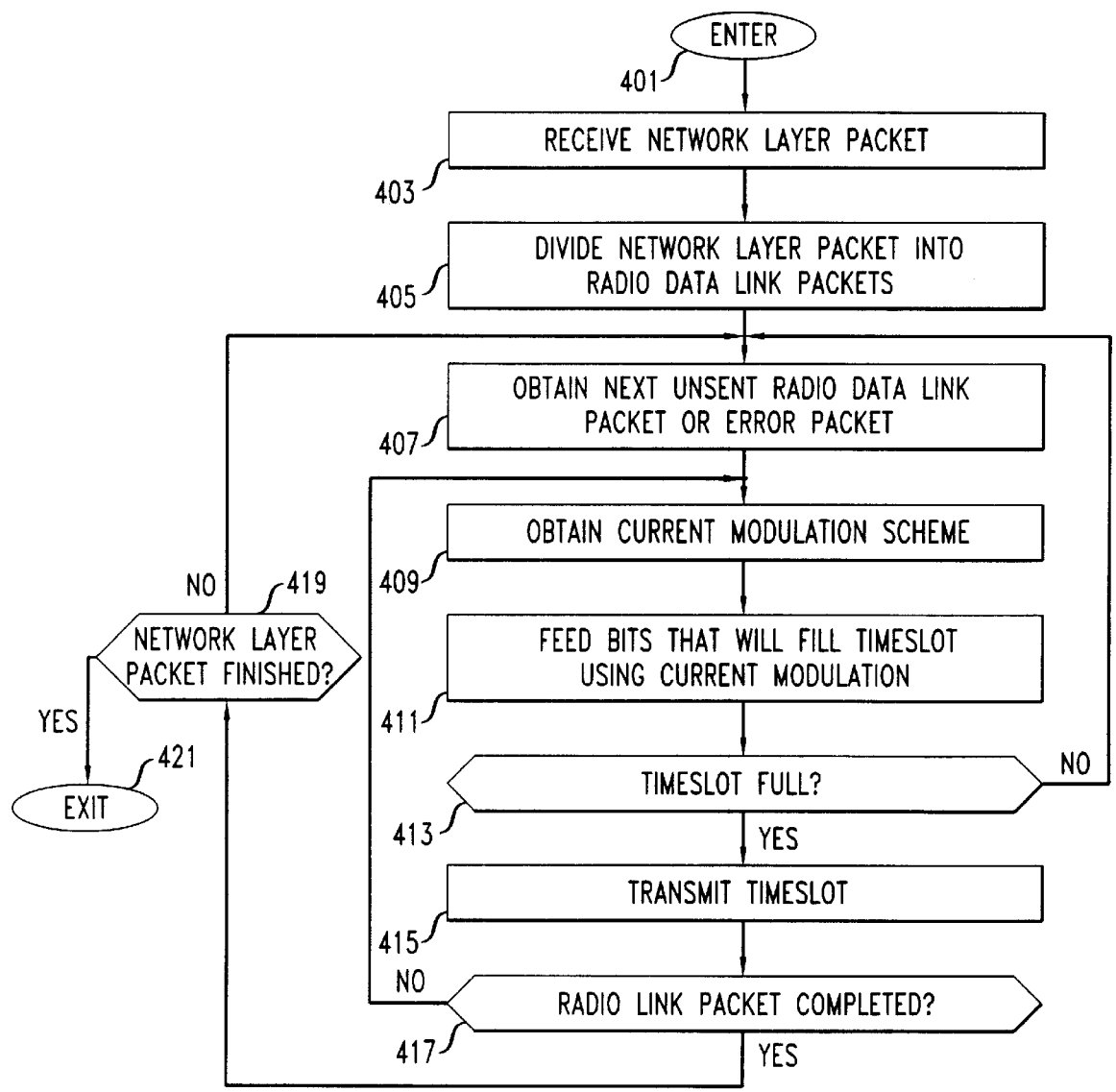
FIG. 4 shows, in flow chart form, an exemplary process for transmitting network layer packets across a radio link in accordance with the principles of the invention.

FIG. 4 shows, in flow chart form, an exemplary process for transmitting network layer packets across the radio link in accordance with the principles of the invention. The process is entered in step 401 when it is time to transmit a network layer packet. Next, in step 403, the network layer packet is received, e.g., from the wired network or from a user data source. Thereafter, the network layer packet is formatted into radio data link packets in step 405. This process typically includes dividing the network layer packet into multiple payloads for radio data link packets and appending the appropriate control information, e.g., header and trailer.

Starting with step 407 a loop is executed to transmit the various radio data link packets that correspond to the network layer packet and to retransmit them in the case of any error. In step 407 any packet that was previously transmitted but which was received with at least one error detected by the receiver is obtained. As described herein above, an error is detected in a packet if there was an error detected for any time slot that was transmitted with information that was part of that packet or if the packet overall was found to have an error even though every time slot appeared to be correctly received. If there are no packets for which an error was indicated waiting for retransmission, the next unsent radio data link packet is obtained, if any.

In step 409 the current modulation scheme is obtained, and in step 411 the bits that will fill a time slot are fed into a time slot formatter to be modulated using the current modulation scheme. Next, conditional branch point 413 tests to determine if the remaining available bits of the current radio data link packet have filled the time slot. If the test result in step 413 is NO, indicating that there are insufficient bits remaining in the current radio data link packet to fill the time slot using the current modulation scheme, control passes back to step 407 to obtain a next radio data link packet, some of the bits of which will be included in the current time slot as well. If there is no radio data link packet remaining to be transmitted, the time slot is padded, e.g., with all zeros. If the test result in step 413 is YES, indicating the time slot is full, control passes to step 415 in which the time slot is transmitted.

Control then passes to conditional branch point 417 which tests to determine if the current radio data link packet has been completely transmitted. If the test result in step 417 is NO, control passes back to step 409 and the process continues as described above. If the test result in step 417 is YES, then conditional branch point 419 tests to determine if the network layer packet is finished, i.e., all bits of the network layer packet have been transmitted. If the test result in step 419 is NO, control passes back to step 407 and the process continues as described above. If the test result in step 419 is YES, the process exits at step 421.

Note that if multiple radio beams are employed, each radio beam may transmit its own independent frame. Advantageously, in accordance with an aspect of the invention, the time slots that are employed for a user within a single time frame period need not all be transmitted by the same radio beam. In other words, such time slots may appear with the different frames that are transmitted by the various radio beams. The only requirement is that the time slots must be nonoverlapping in time to prevent a collision from occurring and the data from being corrupted.

What is claimed is:

1. A method for use in communicating data over a wireless interface, said wireless interface being adapted to use a plurality of constellation mapping schemes to map bits of said data to symbols, the method comprising the steps of:

segmenting a network layer packet into radio data link packets;

appending an error detecting code to each of said radio data link packets;

segmenting data of said appended-to radio data link packet into pieces sized suitably for insertion into time slot of a fixed number of symbols, the number of data bits contained within each one of said time slots being a function of a particular one of said constellation mapping schemes employed for said each time slot;

appending an error detecting code to each of said time slot sized pieces using for each time slot its respective one of said constellation mapping schemes;

transmitting said appended-to time slot over said wireless interface;

determining that an error occurred at a receiver in reception of at least one of said appended-to radio data link packets; and retransmitting no more than the data contained within said appended-to radio data link packet containing said error and any required overhead for said retransmission employing a constellation mapping for said retransmitted data that is a function of a channel quality at the time of said retransmission.

2. The invention as defined in claim 1 wherein in said determining step it is determined that said error occurred in a particular one of said transmitted time slots.

3. The invention as defined in claim 1 wherein in said determining step it is determined that said error occurred in a one of said transmitted time slots of said radio data link packet but that a particular time slot containing said error cannot be specifically identified.

4. The invention as defined in claim 1 wherein in said determining step it is determined that said error occurred in a particular one of said transmitted time slots and wherein in said retransmitting step a different one of said constellation mapping schemes is employed than was employed when said data in said particular time slot was previously transmitted.

5. The invention as defined in claim 1 wherein in said determining step it is determined that said error occurred in a particular one of said transmitted time slots and wherein in said retransmitting step the same one of said constellation mapping schemes is employed than was employed when said data in said particular time slot was previously transmitted.

6. The invention as defined in claim 1 wherein said radio data link packets have a fixed byte length.

7. The invention as defined in claim 1 wherein said radio data link packets have a variable byte length that is specified within each of said variable length packets.

8. The invention as defined in claim 1 wherein said system employs radio data link packets with a fixed length and packets with a variable length, the type of radio data link packet being identified in a header of said packet.

9. The invention as defined in claim 1 wherein in said segmenting step the number of bits assigned to each time slot is a function of said particular one of said constellation mapping schemes employed for said each time slot.

10. The invention as defined in claim 1 wherein said retransmitting step may retransmit data from time slots in one of the manners of the set of manners consisting of:

interleaved with radio data link packets of said network layer packet that were never transmitted before;

subsequent to transmission of all radio data link packets of said network layer packet before transmission of data of another network layer packet;

subsequent to transmission of all of said data of said radio data link packet and after transmission of data of another network layer packet from said user; and in an order different from the order in which said data of said network layer packet was originally transmitted in said time slots.

11. The invention as defined in claim 1 wherein said error detecting code appended to each of said time slots can detect the existence of particular errors that occur within each said time slot.

12. The invention as defined in claim 11 wherein said error detecting code appended to each of said one of said packets detects the existence of errors that are not detectable by any of said error detecting code appended to each of said time slots and yet occur within said packet.

13. A method for use in communicating data over a wireless interface, said wireless interface employing time slots having a fixed number of symbols, said symbols having bits of data mapped to them using one of a plurality of constellation mapping schemes, the method comprising the steps of:

segmenting a network layer network packet into radio data link packets, each said network layer network packet further including an error detecting code;

dividing said radio data link packet into said time slots, said time slots further including an error detecting code that for each time slot uses its respective one of said constellation mapping schemes;

transmitting said time slots; and retransmitting, when an error occurred at a receiver in reception of at least one of said radio data link packets, no more than the data contained within said at least one particular radio data link packet containing an error and any required overhead for retransmission, said retransmission being performed using a constellation mapping for any retransmitted data that is a function of a channel quality at the time of said retransmission.

14. The invention as defined in 13 wherein in said retransmitting step a different one of said constellation mapping schemes is employed for at least one time slot than was employed when said data in said at least one time slot was previously transmitted.

15. The invention as defined in 13 wherein said retransmitting step may retransmit data from time slots in one of the manners of the set of manners consisting of:

interleaved with radio data link packets of said network layer packet that were never transmitted before;

subsequent to transmission of all radio data link packets of said network layer packet before transmission of data of another network layer packet;

subsequent to transmission of all of said data of said radio data link packet and after transmission of data of another network layer packet from said user; and in an order different from the order in which said data of said network layer packet was originally transmitted in said time slots.

16. A method for use in communicating data over a wireless interface, said wireless interface employing time slots having a fixed number of symbols, said symbols having bits of data mapped to them using one of a plurality of constellation mapping schemes, the method comprising the steps of:

transmitting a network layer packet as one or more time slots, said time slots each being mapped using an independently selected one of said plurality of constellation mapping schemes, said time slots each being part of a respective one of a plurality of radio link data packet into which said network layer packet is divided; and transmitting again only information of said network layer packet that is within any of said time slots that make up a particular radio data link packet which was indicated to have been received in error after said transmitting a network layer packet step;

wherein in said transmitting again step each time slot is mapped using one of said plurality of constellation mapping schemes which is selected independently from any other time slot transmitted in said transmitting a network layer packet step and in said transmitting again step.

17. Software in computer readable form for use in a system having communicating a wireless interface for communicating data, said wireless interface employing time slots having a fixed number of symbols, said symbols having bits of data mapped to them using one of a plurality of constellation mapping schemes, the software comprising modules for making said processor:

transmit a network layer packet as one or more time slots, said time slots each being mapped using an independently selected one of said plurality of constellation mapping schemes, said time slots each being part of a respective one of a plurality of radio link data packet into which said network layer packet is divided; and transmitting again only information of said network layer packet that is within any of said time slots that make up a particular radio data link packet which was indicated to have been received in error after said transmitting a network layer packet step;

wherein in said transmitting again step each time slot is mapped using one of said plurality of constellation mapping schemes which is selected independently from any other time slot transmitted in said transmitting a network layer packet step and in said transmitting again step.

* * * * *